US009553956B2

(12) United States Patent
Li et al.

(10) Patent No.: US 9,553,956 B2
(45) Date of Patent: Jan. 24, 2017

(54) SELF-ADAPTIVE NETWORK CONTROL TRANSMISSION METHOD AND SYSTEM BASED ON TCP

(75) Inventors: Hui Li, Guangdong (CN); Sicong Song, Guangdong (CN); Kai Pan, Guangdong (CN); Shuoyan Li, Guangdong (CN); Xudong Fan, Guangdong (CN); Ruiyuan Li, Guangdong (CN)

(73) Assignee: PEKING UNIVERSITY SHENZHEN GRADUATE SCHOOL, Shenzhen, Guangdong (CN)

( * ) Notice: Subject to any disclaimer, the term of this patent is extended or adjusted under 35 U.S.C. 154(b) by 0 days.

(21) Appl. No.: 13/514,641

(22) PCT Filed: Jul. 19, 2011

(86) PCT No.: PCT/CN2011/077329
§ 371 (c)(1),
(2), (4) Date: Jun. 8, 2012

(87) PCT Pub. No.: WO2012/174763
PCT Pub. Date: Dec. 27, 2012

(65) Prior Publication Data
US 2014/0112352 A1   Apr. 24, 2014

(30) Foreign Application Priority Data
Jun. 22, 2011  (CN) .......................... 2011 1 0169536

(51) Int. Cl.
H04L 29/08 (2006.01)
H04L 29/06 (2006.01)

(52) U.S. Cl.
CPC ............. *H04L 69/161* (2013.01); *H04L 69/16* (2013.01)

(58) Field of Classification Search
CPC ...... H04L 29/06; H04L 63/0281; H04L 67/14; H04L 47/27; H04L 69/16; H04L 69/161; G06T 9/008; G06T 5/001; H03M 3/436
(Continued)

(56) References Cited

U.S. PATENT DOCUMENTS 6,003,084 A * 12/1999 Green et al. .................. 709/227
8,130,776 B1 * 3/2012 Sundararajan et al. ...... 370/401
(Continued)

OTHER PUBLICATIONS

Raouf Boutaba, Networking 2005 Networking Technologies, Services, and Protocols; Performance of Computer and Communication Networks; Mobile and Wireless Communication Systems, 2005, 4th International IFIP-TC6 Networking Conference, LNCS3462, p. 1411.*

*Primary Examiner* — Mohamed Kamara
(74) *Attorney, Agent, or Firm* — Jackson IPG PLLC; Demian K. Jackson

(57) ABSTRACT

Embodiments of the invention relate to a self-adaptive network control transmission method and system based on TCP. By creating network coding layer between transmission layer and IP layer on both the sending and receiving nodes, we can add network-coding headers which contains specific variables in the coding packets and ACK packets, transmit and refresh those variables through network-coding packets and ACK packets, and adjust redundancy factor R according to the variables. This method can strengthen the resistance to burst loss and maintain the redundancy factor R at the optimum value, thus raise the network throughputs.

2 Claims, 9 Drawing Sheets

(58) Field of Classification Search
USPC .................. 370/216, 231, 252, 389–390, 401,370/463–465; 709/219, 231, 228
See application file for complete search history.

(56) References Cited

U.S. PATENT DOCUMENTS

| | | | | |
|---|---|---|---|---|
| 8,312,329 | B1* | 11/2012 | Yellapantula | H04L 1/24 714/704 |
| 8,780,693 | B2* | 7/2014 | Kim | G06F 15/16 370/216 |
| 2007/0274388 | A1* | 11/2007 | Lee | H04N 19/593 375/240.13 |
| 2009/0041367 | A1* | 2/2009 | Mansour | 382/252 |

* cited by examiner

SELF-ADAPTIVE NETWORK CONTROL TRANSMISSION METHOD AND SYSTEM BASED ON TCP

TECHNICAL FIELD OF THE INVENTION

This invention involves TCP, especially dedicated on network control transmission based on TCP which is combined with network coding theory.

BACKGROUND OF THE INVENTION

The arithmetic of TCP based on Network Coding (NC-TCP in short) is to mask losses from TCP using random linear coding, thus improve the throughput. This method assures that there is large possibility that the data packets carry new information. Unless the receiver has already the same information as the sender, it will get new information.

We make some important modifications in order to incorporate coding. First, instead of the original packets, we transmit random linear combinations of packets in the congestion window. With a large field size, every random linear combination is very likely to cause the next unseen packet to be seen. So even if a transmitted linear combination is lost, the next successful reception will cause the next unseen packet to be seen. In another words, the loss of the link is presented to TCP as an additional queuing delay that leads to a larger effective round-trip time (RTT). The initial time-up retransmission system is replaced by the redundancy factor R, while R indicates the send times of linear combinations that wait to be sent. The RTT mentioned above has a new explanation, that is, the time that the network transmits a degree. The more losses happened, the larger the RTT is. We choose TCP-Vegas to combine with the network coding theory, the sender marks every time when every linear combination sends. When ACK arrives, it figures out RTT. Second, on the receiver, we bring in a notion called "seeing a packet". The definition is a node is said to have seen a packet $p_k$ if it has enough information to compute a linear combination of the form $(p_k+q)$, where $q=\Sigma_{l>k}\alpha_l p_l$, with $\alpha_l \epsilon F_q$ for all $l>k$. Thus, q is a linear combination involving packets with indices larger than k. On the receiver, when it sees a packet $p_k$, it can immediately send back ACK to the sender, rather than waiting to decode this packet. The notion of "seeing a packet" solves the problem of the ACK that may not be sent back to the sender because of the delay of decoding. It seals the network coding theory to TCP.

NC-TCP brings another two notions, the "knowledge of a node" and "virtual queue". The knowledge of a node is the set of all linear combinations of original packets that it can compute, based on the information it has received so far. The coefficient vectors of these linear combinations from a vector space called the knowledge space of the node. The number of the virtual queues equals the number of the receivers. The length of the jth queue equals to the difference of the dimensions of the knowledge space between the sender and the jth receiver.

All the theories above needs to combine with TCP in a non-imposing way, so MIT invented a NC layer which is between transmission layer and IP layer. The operation describes as follows:

The sender module accepts packets from the TCP source and buffers them into an encoding buffer which represents the coding window, until they are ACKed by the receiver. The sender then generates and sends random linear combinations of the packets in the coding window. The coefficients used in the linear combination are also conveyed in the header.

For every packet that arrives from TCP, R linear combinations are sent to the IP layer on average, where R is the redundancy parameter. The average rate at which linear combinations are sent into the network is thus a constant factor more than the rate at which TCP's congestion window progresses. This is necessary in order to compensate for the loss rate of the channel and to match TCP's sending rate to the rate at which data is actually sent to the receiver. If there is too little redundancy, then the data rate reaching the receiver will not match the sending rate because of the losses. This leads to a situation where the losses are not effectively masked from the TCP layer. Hence, there are frequent timeouts leading to a low throughput. On the other extreme, too much redundancy is also bad, since then the transmission rate becomes limited by the rate of the code itself. Besides, sending too many linear combinations can congest the network. The ideal level of redundancy is to keep R equal to the reciprocal of the probability of successful reception.

Upon receiving a linear combination, the receiver module first retrieves the coding coefficient from the header and appends it to the basis matrix of its knowledge space. Then, it performs a Gaussian elimination to find out which packet is newly seen so that this packet can be ACKed. The receiver module also maintains a buffer of linear combinations of packets that have not been decoded yet. In addition, when the receiver sees a packet, it informs the sender and the sender will discard this packet.

In NC-TCP, the redundancy factor R is fixed, we need to know the loss rate of the network circumstance, and set R to the optimal number. However, when the system is under lossy networks, especially wireless network where the loss rate is not constant, the constant redundancy factor R may cause problems, either sending bunches of useless redundancy packets or being not able to mask the packets loss. Both will impair the performance of the network.

SUMMARY OF THE INVENTION

To improve the NC-TCP, this invention brings out a self-adaptive network control transmission method and system based on TCP, and have a simulation.

The method is to add information about the current circumstances in the packet header by embedding NC layer, and actively adjust R in the network coding (NC in short) layer of the sender.

A self-adaptive network control transmission method based on TCP, including adding network coding layer between transmission layer and IP layer on both the sender and the receiver, adding network-coding headers which contains specific variables in the coding packets and ACK packets, transmitting and refreshing those variables through the coding packets and ACK packets, and adjusting redundancy factor R in the network coding layer of the sender according to the variables.

More materially, this invention is a self-adaptive network control transmission method based on TCP, adding network-coding headers which contains specific variables in the coding packets and ACK packets, transmitting and refreshing those variables through network-coding packets and ACK packets and is operated as the following methods:

On the sender, we add specific variables in the NC header, including linear coefficient vector γ and a variable pktID, those variables will be subtracted by the NC layer on the receiver. The vector γ is for decoding, and the variable pktID will be evaluated to a new variable echo_pktID.

On the receiver, we add specific variables in the NC header of the ACK packet, including a variable echo_pktID and another variable loss, loss=pktID−id. Echo_pktID indicates the only sequence number that result to generate the ACK packet and loss indicates the difference between pktID and id. The ACK packets transmit the two variables to the sender.

When the NC layer of the sender receives the ACK, it subtracts the ACK's NC header and gets the echo_pktID and loss.

The feature of this invention includes adjusting R in the NC layer of the sender, the method is: add following variables in the NC layer of the sender: R_old indicates the right-now redundancy factor; W indicates the minimum number of echo_pktID when the last time to change R. If echo_pktID equals the number of W+10*R_old or is larger than that for the first time, then change the redundancy factor R:

Use the loss to figure out the number of diff_new_loss in the NC layer of the sender, that is diff_loss_new=loss−loss_old; Loss_old indicates the value of loss in ACK when change the last time to change R, diff_loss_new indicates the difference between two losses. Use diff_loss_new to figure out the new value of the redundancy factor R_new, that is R_new=R_old+2*(diff_loss_new/10)+(diff_loss_old/10); Diff_loss_old indicates the value of diff_loss_new when the last time to change R; Refresh the variables in the NC layer of the sender, that is R_old=R_new, loss_old=loss, diff_loss_old=diff_loss_new, W=W+10*R_new.

Such method actively adjusts redundancy factor R, thus can raise the resistance to burst loss and maintain R to an optimum value in various network circumstances and raise the network throughputs and link usage.

According to the methods above, this invention brings out a self-adaptive network control transmission system based on TCP, including sender and receiver. This system add NC layer between transmission layer and IP layer on both sides, the sender and the receiver.

In the system, the NC layer on sender includes two control transmission modules: one is used to deal with the packets which are sent from transmission layer on sender. This module encodes the data packets and puts specific variables in the NC headers. The variables are the linear coefficient vector and pktID, and will be extracted by the NC layer on the receiver to decode the packets and evaluated to echo_pktID.

The other module is used to deal with the ACKs which are sent from the receiver. This module subtracts the NC headers of ACK and gets echo_pktID, uses this variable to determine whether it is time to change R. If echo_pktID equals the number of W+10*R_old or is larger than that for the first time, then change the redundancy factor R: Use the loss to figure out the number of diff_new_loss in the NC layer of the sender, that is diff_loss_new=loss−loss_old; Loss_old indicates the value of loss in ACK when change the last time to change R, diff_loss_new indicates the difference between two losses. Use diff_loss_new to figure out the new value of the redundancy factor R_new, that is R_new=R_old+2*(diff_loss_new/10)+(diff_loss_old/10); Diff_loss_old indicates the value of diff_loss_new when the last time to change R; Refresh the variables in the NC layer of the sender, that is R_old=R_new, loss_old=loss, diff_loss_old=diff_loss_new, W=W+10*R_new.

There are two modules in the NC layer of the receiver: one is used to deal with the ACKs sent from transmission layer. The module determines whether the ACK packet is used to found the connection, if so, sends it to the IP layer. If not, discards it and returns back to wait.

The other module is used to deal with the packets which are sent from the sender. If the module receives a packet from the IP layer, it will subtract the NC header and extract the coding coefficient vector γ and pktID, and decode to get the initial packet. Meanwhile it will create a new ACK which contains NC header. The NC header contains two variables, the loss and echo_pktID. Send the new ACK to the IP layer.

To be more clearly: in tradition TCP/IP system, there are application layer, transmission layer. IP layer, link layer and physical layer from top to bottom. This invention embeds network-coding layer between transmission layer and IP layer on both the sender and receiver and adds specific variables in the NC layer of network-coding packets and ACKs, transmits and refreshes those variables through network-coding packets and ACKs to adjust the mode of network transmission, thus to meet the real needs.

In the NC layer of the sender, we transfer the packets that received from transmission layer to IP layer. There is NC buffer in the NC layer to catch the data packets delivered from transmission layer. When coding, combine all packets in the buffer, add NC header and generate a coding packet to deliver to the IP layer.

In NC headers of the sender, there are some specific information used to decode the packets and record the current network circumstances. The information includes: (1) the linear coefficient vector γ used to generate coding packets. Since a coding packet is the linear combination of all packets in the coding buffer, γ records every random coefficient of each initial packet. (2) a variable pktID to indicates the sequence number of the coding packet. On the receiver, NC layer will get the coding packets delivered from IP layer. When get the coding packet, NC layer will subtract the NC header, extract the information in the header and put the coding packet to the decode module. If it sees a new initial packet, then generate an ACK to the IP layer; If decodes a new initial packet, then deliver it to the transmission layer and discard the relatively coding packet in the decoding matrix.

The information extracted from NC headers include: (1) the linear coefficient vector γ used to generate coding packets. This vector is delivered to decoding module to decode the initial packets. (2) a variable pktID. This variable will be evaluated to echo_pktID in the NC layer of the receiver.

We also add NC header in the ACK generated in the NC layer of the receiver. The information in it is used to adjust the control parameter in the NC layer of the receiver. The information in NC header of ACK includes: (1) echo_pktID, which indicates the sequence number of the coding packet that result to this ACK. (2) loss, which indicates the difference between the coding packet's pktID and the latest seen initial packet's id. To be materially, when seeing a new initial packet, it generates a new ACK and every initial packet has its own id. Because there are always some packets missing during the transmission, id will definitely equal to or smaller than pktID. loss=pktID−id. It indicates how many coding packets the NC layer of the receiver needs to see or decode the initial packet.

On the receiver, the NC layer may get the initial ACK delivered from the transmission layer. If this ACK is a control packet, deliver it to the IP layer; If not, just discard it.

On the sender, besides the initial data packets and control packets delivered from transmission layer, the NC layer may also receive ACK delivered from the IP layer. When it gets ACK, subtracts the NC header of the ACK and extracts the information in it. The information includes: (1) echo_pktID. When echo_pktID=(W+R_old) or echo_pktID>(W+R_old) for the first time, it starts to adjust the R. R_old indicates the current redundancy factor, W indicates the minimum value of echo_pktID when the last time to change the R. Otherwise, discard the initial packet which is already ACKed in the coding buffer, and deliver the ACK to the transmission layer. (2) loss. When the system comes into the state that to adjust the R, use loss to figure out the value of diff_loss_new, that is diff_loss_new=loss−loss_old. Loss_old indicates the value of loss in ACK when change the last time to change R, diff_loss_new indicates the difference between two losses. Use diff_loss_new to figure out the new value of the redundancy factor R_new, that is R_new=R_old+2*(diff_loss_new/10)+(diff_loss_old/10); Diff_loss_old indicates the value of diff_loss_new when the last time to change R; Refresh the variables in the NC layer of the sender, that is R_old=R_new, loss_old=loss, diff_loss_old=diff_loss_new, W=W+10*R_new. Up until now, the sender finishes changing R, the NC layer will delete the ACKed initial packets in the coding buffer and deliver the ACK to the transmission layer.

BRIEF DESCRIPTION OF THE DRAWINGS

Combining the following description and figures, the reader will have a deeper understanding to the character and advantage of this invention.

DETAILED DESCRIPTION OF THE PREFERRED EMBODIMENTS

The following description gives a lot of special details, provided to deeply understand this invention. However, in the experts' sights, the operation is not rely on these details. To avoid unnecessary chaos, we do not describe the methods, the proceedings, and the components which are already mentioned before.

The algorithm and operation of the self-adaptive network transmission control system:

To clarify the target, technique scheme and advantages, the following will describe the operation method in detail.

This invention provides a self-adaptive network transmission control system based on TCP. It has a unique advantage under unstable circumstances, especially wireless situations.

Figure 1:
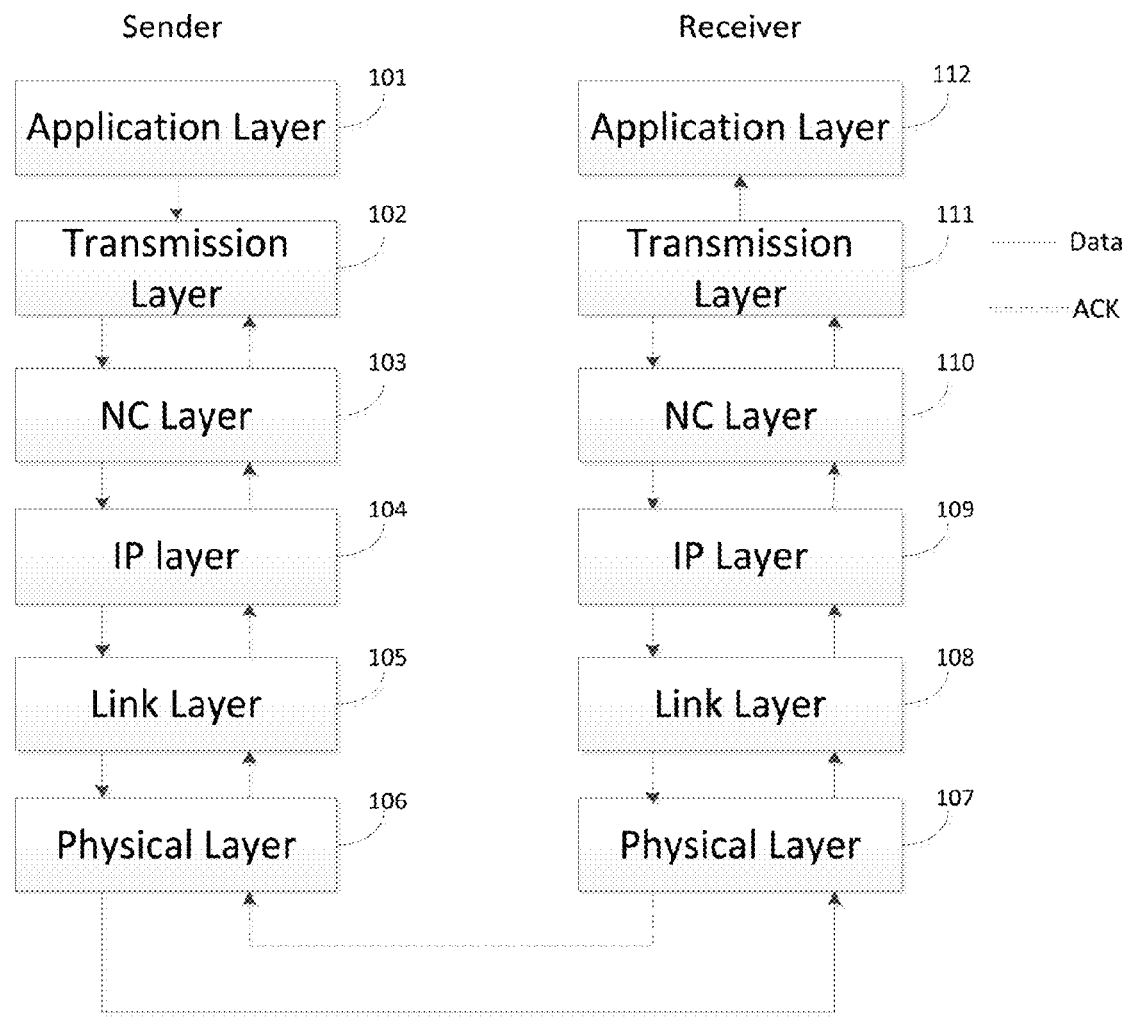
FIG. 1: The TCP/IP system after embed NC layer.

We consider the simple peer to peer communication. In this situation, every node can both be sender and receiver. To simplify, we make one node only have the function of sender and the other one receiver. According to FIG. 1, in sender, the application layer 101 generates data, and delivers it to the transmission layer 102. The transmission layer 102 adds TCP header to the data, and delivers it to the NC layer 103. The NC layer 103 encodes the initial packets in the coding buffer and adds NC header, and delivers the coding packet to the IP layer. Then the operations in the IP layer 104, link layer 105 and physical layer 106 is transparent to our self-adaptive system.

The data transmits to the receiver through network. On the receiver, the operation in the physical layer 107, link layer 108 and IP layer 109 is also transparent to our system. In the NC layer 110 of the receiver, the system decodes the coding packets, generates ACK and delivers it to the IP layer 109. The initial packet got from the decoding phase is delivered to the transmission layer 111, the send to the relative course in the application layer 112. The ACK generated in the NC layer 110 of the receiver transmits to the sender through network. ACK is delivered to the NC layer 103 of the sender. In the NC layer 103, it deletes the ACKed initial packets, refreshes the redundancy factor R and other variables in the NC layer according to the information in the ACK. Then delivers the ACK to the transmission layer 102 after subtracts its NC header.

Up until now, our system has finished the process that a packet transmits from sender to receiver and sends back ACK to the sender. We now describe the operation process in the NC layer 103 of the sender in detail.

Figure 2:
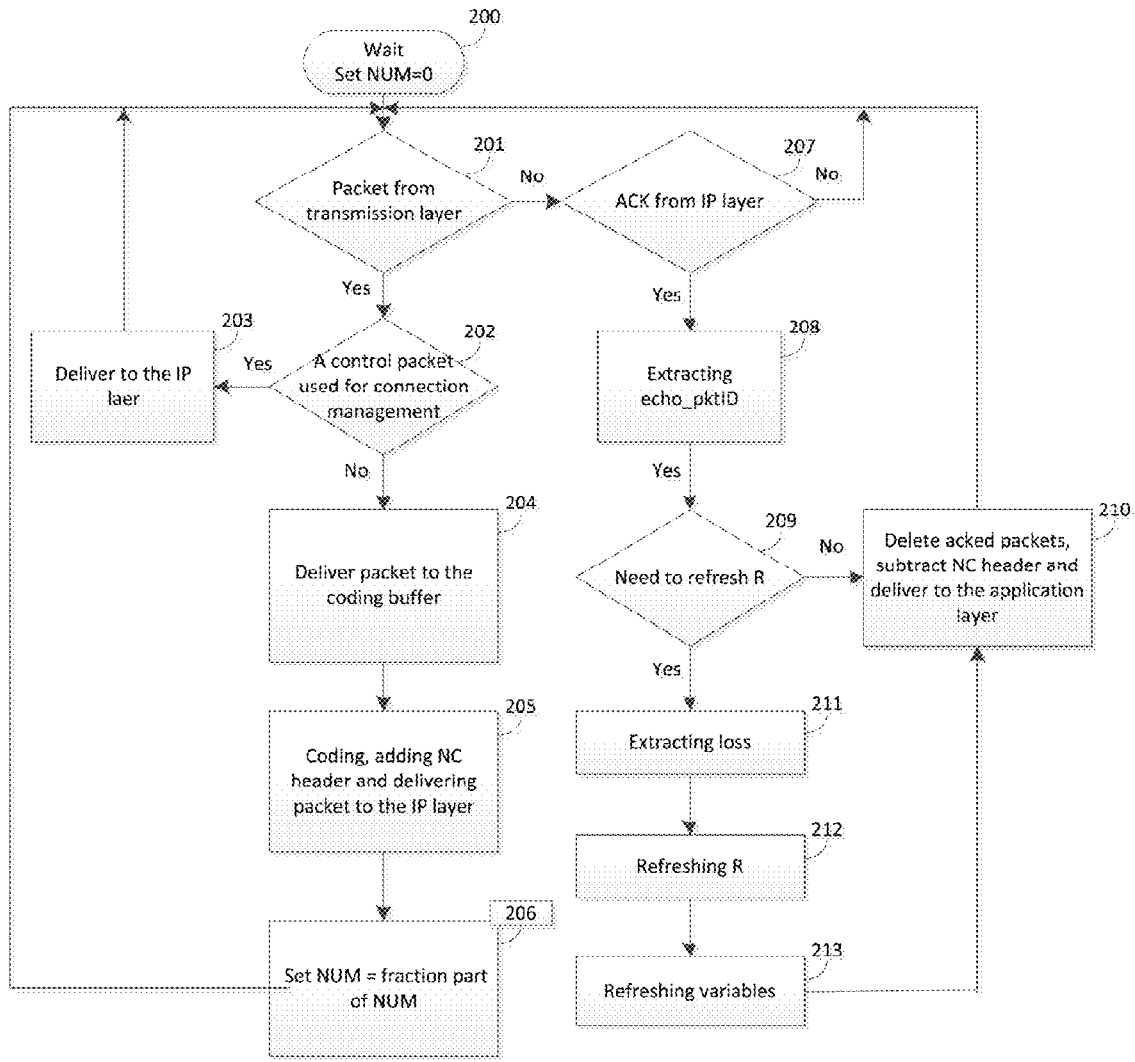
FIG. 2: The flow chart of the NC layer of sender.

On the sender side, the NC layer 103 has to respond to two types of events—the arrival of a packet from the sender TCP, and the arrival of an ACK from the receiver via IP. According to FIG. 2, the operation in the NC layer is:

200: First the NC layer 103 of the sender neither receive packet from the transmission layer 102, nor from the IP layer 104. The whole system is on a waiting state. Set NUM to 0;

201: when the NC layer 103 receive a packet, the system judges the style of the packet and do a operation according to its style.

202: If the packet arrives from the transmission layer 102, judges it whether a control packet or a data packet.

203: If the packet is a control packet used for connection management, deliver it to the IP layer 104 and return to wait state.

204: If the packet is a data packet, and is not already in the coding window, add it to the coding window. Set NUM=NUM+R. (R=redundancy factor)

205: Repeat the following operations [NUM] times:
1) Generate a random linear combination of the packets in the coding window.
2) Add the network coding header specifying the set of packets in the coding window and the coefficients used for the random linear combination. Add the variable pktID to the network coding header.
3) Deliver the packet to the IP layer 104.

206: Set NUM=fraction part of NUM. Return to the wait state.

207: Judge whether ACK arrives from IP layer 104. If not, keep waiting.

208: If the packet arrives from the IP layer, pick up the variable echo_pktID, to judge if it is time to adjust the value of R.

209: If echo_pktID=W+10*R_old or echo_pktID>W+10*R_old for the first time, start to reset the value of R, go to 211. Otherwise, go to 210.

210: Remove the ACKed packet from the coding buffer and hand over the ACK to the TCP sender. Return to the wait state.

211: Extravagate the value of loss from the ACK header, diff_loss_new=loss−loss_old;

212: Refresh the value of R, R_new=R_old+2*(diff_loss_new/10)+diff_loss_old/10.

213: Refresh the variables in the NC layer, record variables, such as, R_old=R_new; diff_loss_old=diff_loss_new; loss_old=loss; W=W+10*R_new. After refreshing, go to 210.

In general, the work that the NC layer of the sender needs to do is: (1) encode the data packet. (2) refresh the value of R according to the information in ACK. By these operations, we finish the self-adaptive network transmission control method mentioned before.

Figure 3:
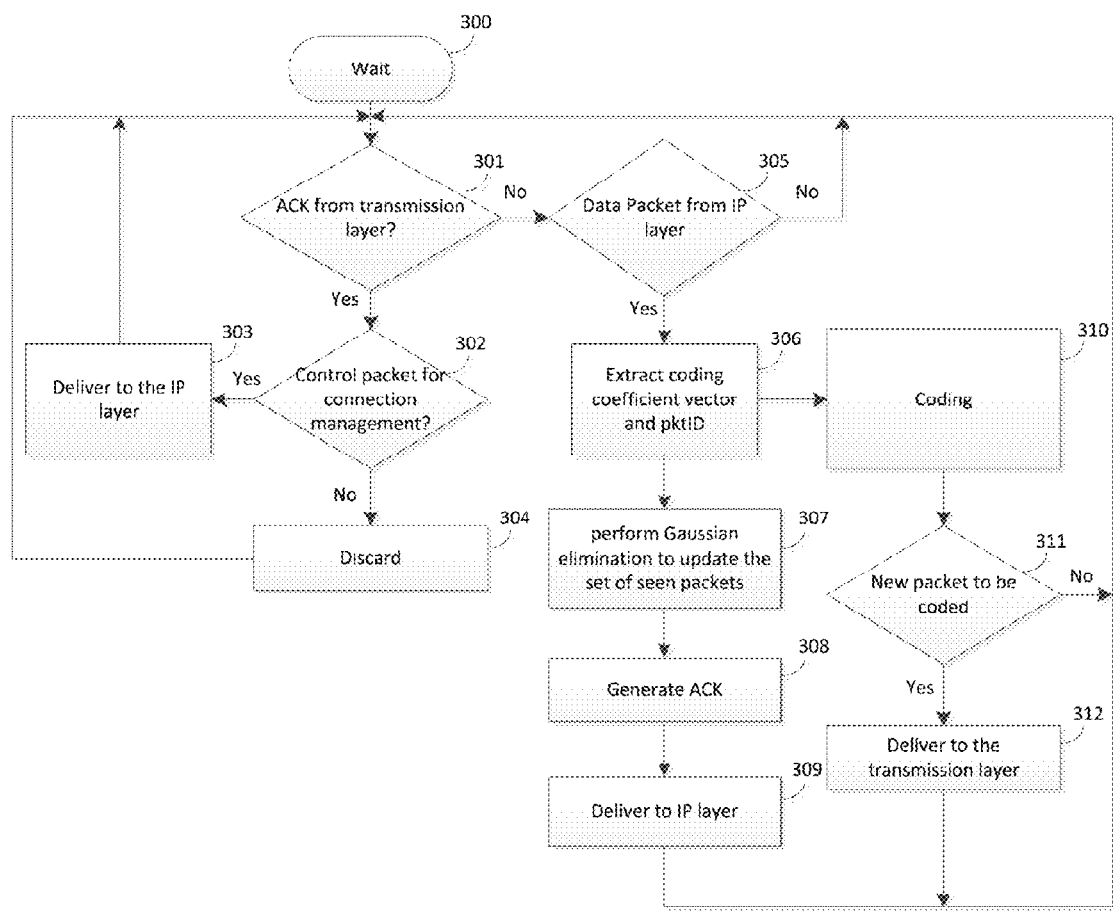
FIG. 3: The flow chart of the NC layer of receiver.

On the receiver, the NC layer 110 also has to respond to two types of events—the arrival of a packet from the sender, and the arrival of ACKs from the TCP sink. According to FIG. 3, the operation in the NC layer 110 is:

300: When the NC layer 110 of the receiver receives neither ACK from transmission layer 111, nor data packet from IP layer 109, the system is on a waiting state.

301: Judge whether the NC layer 110 receive ACK from transmission layer 111.

302: If ACK arrives from the transmission layer, judge if the ACK is a control packet for connection management.

303: If the packet mentioned in 302 is a control packet for connection management, deliver it to the IP layer and return to the wait state.

304: If the packet mentioned in 302 is not a control packet for connection management, the discard it and return to the wait state.

305: Judge if packets arrives from the IP layer 109. If not, return to the wait state.

306: If the packet arrives from the IP layer 109, then remove the network coding header and retrieve the coding vector γ and the variable pktID.

307: Add the coding vector as a new row to the existing coding coefficient matrix, and perform Gaussian elimination to update the set of seen packets.

308: Generate a new ACK with sequence number equals to that of the oldest unseen packets and add two variables loss and echo_pktID to the ACK header.

309: Deliver the ACK to the IP layer 109 and return to the wait state.

310: Add the payload to the decoding buffer. Perform the operations corresponding to the Gaussian elimination, on the buffer contents.

311: Judge if any packet gets decoded in the process. If not, return to the wait state.

312: If any packet gets decoded in the process, deliver it to the TCP sink and remove it from the buffer, and return to the wait state.

In general, the work that the NC layer of the receiver needs to do is: (1) decode to get the initial packets. (2) Generate ACKs.

Up until now, the invention has constructed a whole self-adaptive TCP. It is based on NC-TCP published by MIT, and brings out a self-adaptive theory. By collecting live information in the NV layer of the sender, actively adjusts redundancy factor R to improve the performance of NC-TCP under unstable network circumstances. Thus our new protocol is called Self-adpative Network Coding TCP, SANC-TCP.

Figure 4:
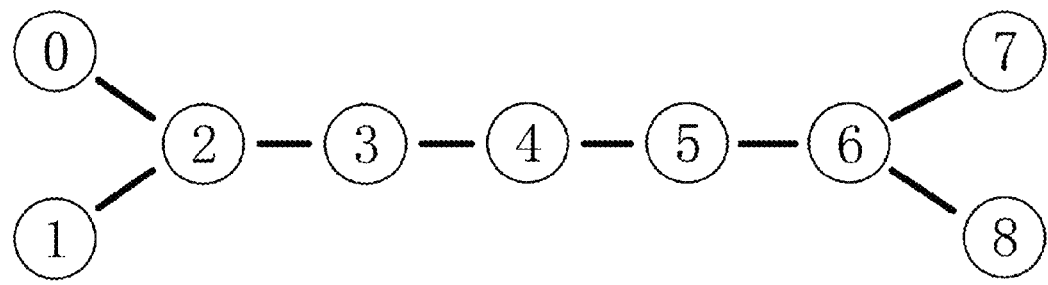
FIG. 4: The topology of the simulation.

The simulation result to improve the new protocol's advantages. We use the network simulator-2[14] developed by UC Berkeley to access the performance of different protocols in network. The topology for all the simulations is a tandem network consisting of 8 hops (hence 9 nodes), shown in FIG. 4.

First we discuss the fairness of the new protocol SANC-TCP. In this system, there are two flows generated by two FTP applications. One is from node 0 to node 7, and the other is from node 1 to node 8. They will compete for the intermediate channels and nodes. All the channels have a bandwidth of 1 Mbps, and a propagation delay of 10 ms. The buffer size on the channel is set to 200. The TCP receive window size is set to 40 packets, and the packet size is 1000 bytes. The Vegas parameters are chosen to be $\alpha=28$, $\beta=30$, $\gamma=2$. By fairness, we mean that if two or more similar flows compete for the same channel, they must receive an approximately equal share of the channel bandwidth. In addition, this must not depend on the order in which the flows join in the network. It is well known that depending on the value chosen for $\alpha$ and $\beta$, TCP-Vegas could be unfair to an existing connection when a new connection enters the bottleneck link. In our simulation, we first choose a certain value of $\alpha$ and $\beta$ (in this case, $\alpha=28$, $\beta=30$) that allows fair sharing of bandwidth when two TCP-Vegas flows without our modification. Then, we choose the same value of $\alpha$ and $\beta$, and figure out the fairness characteristic under three different situations:

Situation 1: a TCP-Vegas flow competes with an SANC-TCP flow.

Situation 2: an SANC-TCP flow competes with another SANC-TCP flow.

Situation 3: five SANC-TCP flows compete with each other.

Figure 5:
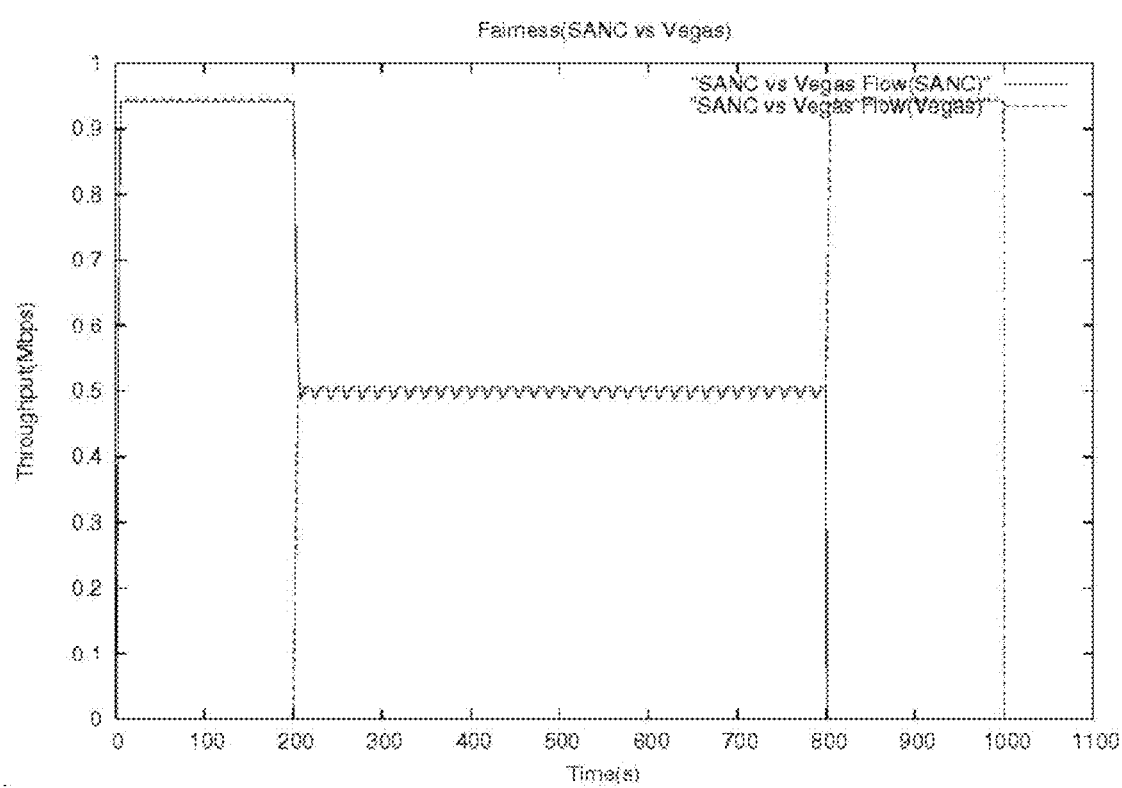
FIG. 5: A TCP-Vegas flow competes with an SANC-TCP flow.
Figure 6:
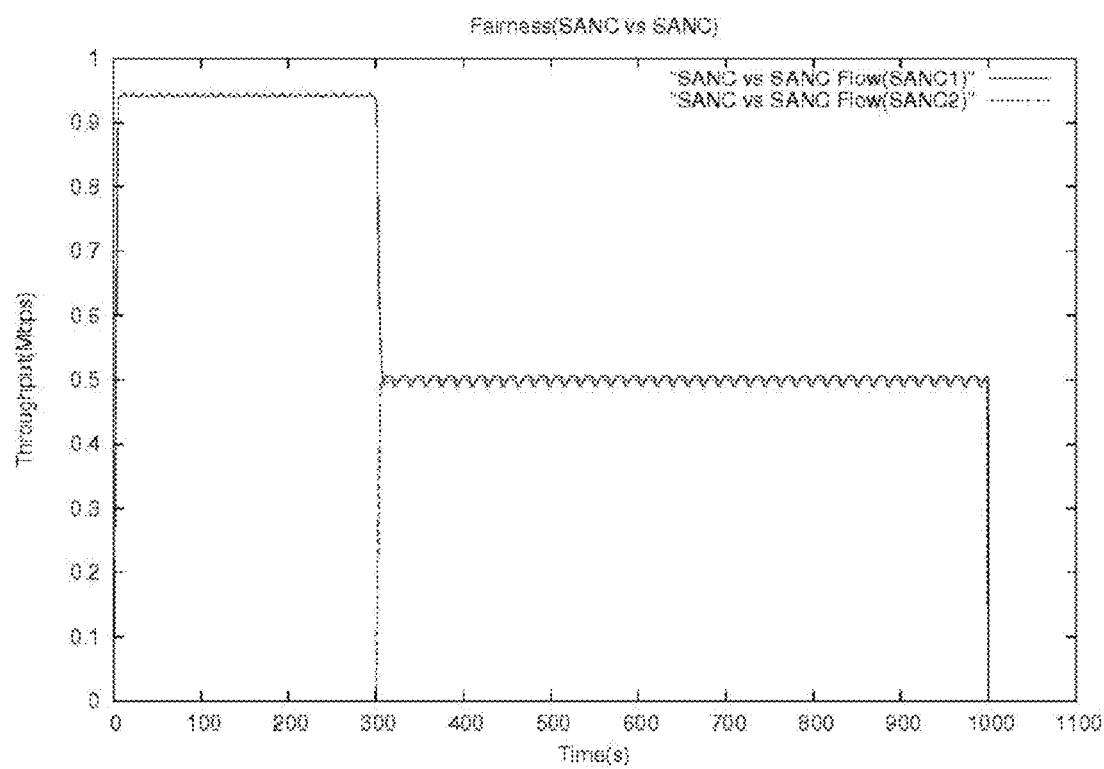
FIG. 6: An SANC-TCP flow competes with another SANC-TCP flow.
Figure 7:
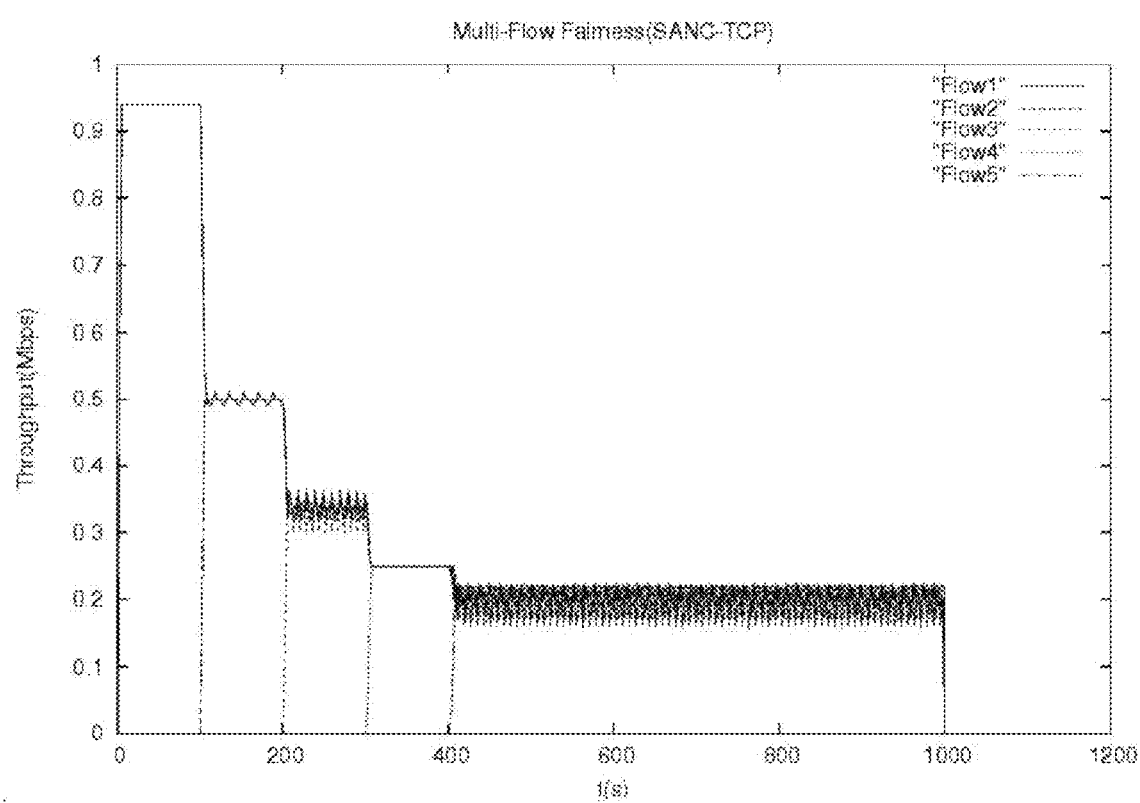
FIG. 7: Five SANC-TCP flows compete with each other.

The result of the simulation is showed in FIG. 5-7, thus improves our new protocol SANC-TCP is fair when choosing the suitable $\alpha$ and $\beta$.

Figure 8:
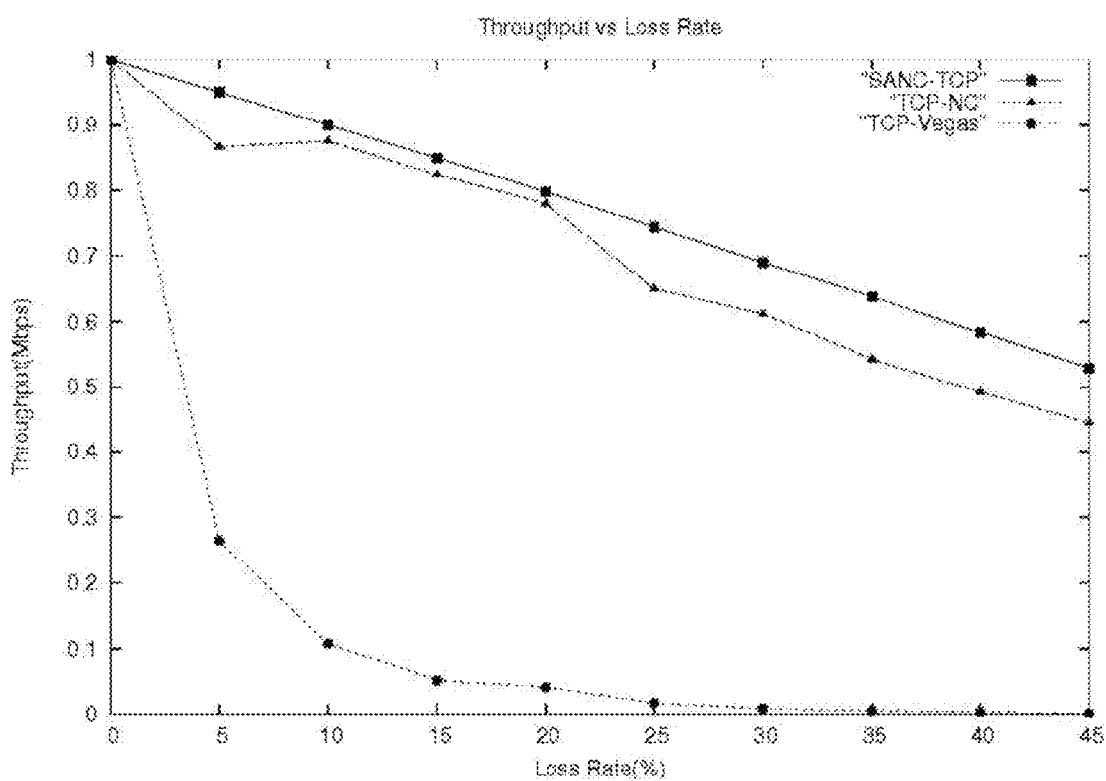
FIG. 8: The throughputs of three different flows under different loss rate.

Backed-up by the simulation, we now try to prove that our new protocol SANC-TCP has a better throughput rate and utilization of the channels under unknown lossy channels, compared to NC-TCP and normal TCP. The topology setup is identical to that used in the fairness simulation, except that now we only use one FTP flow, which is from node 0 to node 7. We set the same loss rate on the channels between node 2 and node 6. We compare the throughput rate and the utility of three different protocols TCP-Vegas, NC-TCP, SANC-TCP under the same lossy channels, with different loss rate every measured time, showed in FIG. 8. For the NC-TCP, we set the redundancy factor at the optimum value corresponding to each loss rate. FIG. 8 shows that, when the loss rate is 0%, the throughput of all three protocols almost reaches the optimal value 1 Mbps. However, as the loss rate becomes larger, the throughput of TCP-Vegas descends drastically, while both NC-TCP and SANC-TCP are close to the theoretical value of maximum utilization of channels. For example, theoretical value of maximum utility of channels is 1 Mbps*(1−20%)=0.8 Mbps when loss rate is set to 20%, as we can see NC-TCP and SANC-TCP are both close to it from FIG. 8.

In order to compare the throughput and utilization of the channel between NC-TCP flow and SANC-TCP flow under various loss rate, we set the R to 1.11 in NC-TCP flow case, while the other parameters of simulation environment are totally the same.

Figure 9:
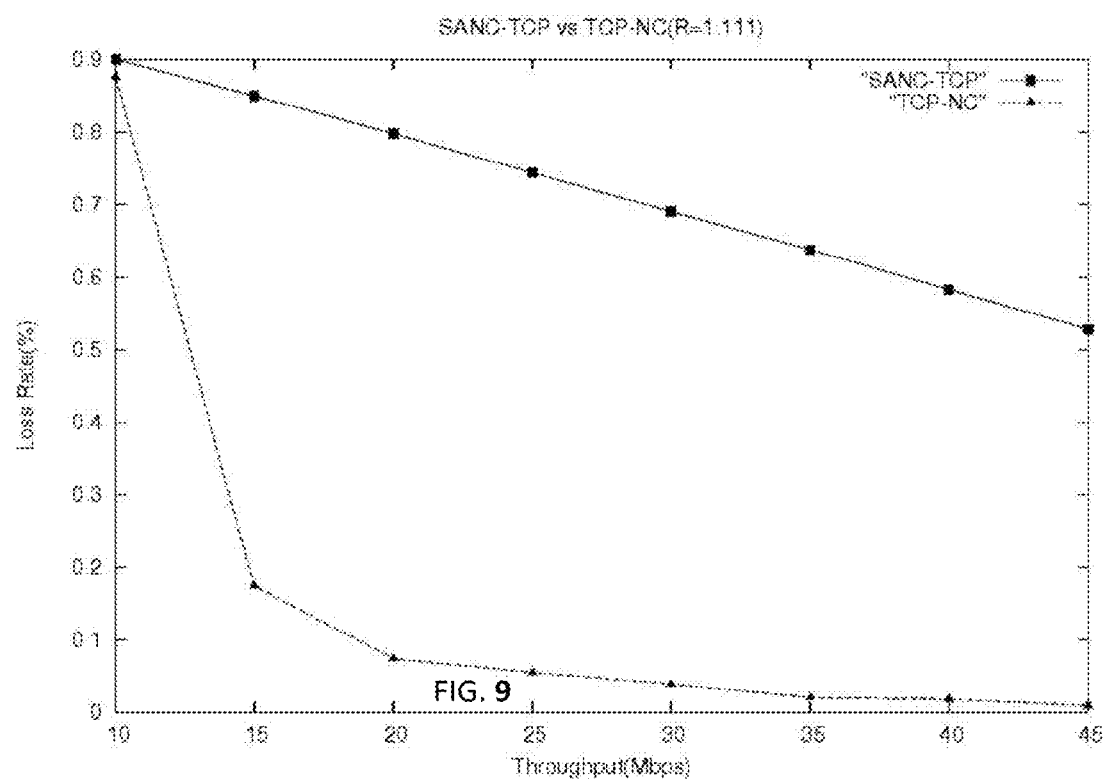
FIG. 9: The throughputs of TCP-NC flow and SANC-TCP flow under different loss rate.

As is shown in FIG. 9, The X-axis represents the different loss rate which is varied from 10% to 45%, and the Y-axis represents the throughput rate corresponding to different loss rate which can also be understood as utilization of the channel. The green line is referred to NC-TCP flow and the red one is to SANC-TCP flow. When the loss rate is 10%, NC-TCP flow requires high throughput with R equals to 1.11 as the optimal value and approximates SANC-TCP flow. However, as the loss rate becomes larger, the throughput of NC-TCP case descends drastically because it cannot mask the packet loss with the R value sticking to 1.11. Adversely, the throughput of SANC-TCP flow is close to theoretical value under every loss rate. For example, the theoretical value of maximum utility of the channel is 1 Mbps*(1−30%)=0.7 Mbps when loss rate is set to 30%, and the SANC-TCP flow is close to it. In addition, given R equals to 1.11, lots of packets will be sent unnecessarily which leads to low performance if there are more than one flow in the network when the loss rate is smaller than 10%. SANC-TCP adjusts R to the practical condition and maintains it at the optimal state which avoids wasting bandwidth.

In real wireless networks, the loss rate is affected by various reasons. Sudden large loss, we call it bursty loss, is one of the phenomena that occur in the system. To evaluate the performance of the three different protocol flows under bursty loss situation, we set a circumstance where the loss rate of the system is kept as 10%, except for the time from 500 s to 600 s, the loss rate is changed to 30%. We use the same topology as Part A and Part B.

Figure 10:
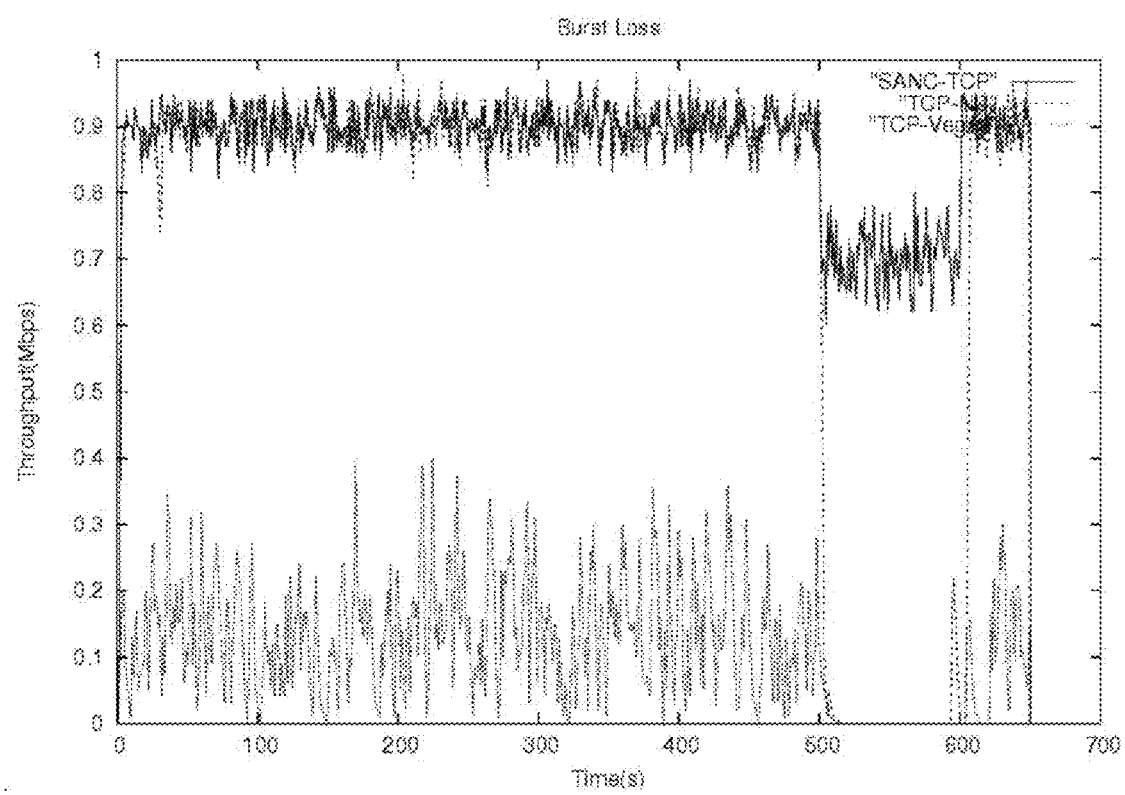
FIG. 10: Bursty loss situations.

As is shown in FIG. 10, the X-axis represents the simulation time, and the Y-axis represents the throughput or the utilization of the channel. The blue line is referred to TCP-Vegas flow, the green line is referred to NC-TCP flow whose redundant factor R is set to the optimal value of 1.11 and the red line is referred to SANC-TCP flow. During the time when the loss rate is kept in 10%, the NC-TCP flow and SANC-TCP flow can both nearly reach the theoretical value of the throughput. However, when the time comes to 500 s, the loss rate is suddenly changed to 30% until 600 s. According to FIG. 8, NC-TCP flow suffers a lot during the time from 500 s to 600 s, the throughput is almost drop to 0. Comparably, the SANC-TCP shows its robustness to the bursty loss, and maintains the theoretical value of throughput during 500 s to 600 s.

In conclusion, the self-adaptive network control transmission method based on TCP can become a perfectly self-adaptive TCP, that is, SANC-TCP. The system can send redundant packets and actively adjust the redundancy factor R, thus to solve the problem of the packets loss. There are just tiny changes compared to the original protocol stack, but it combines with network coding and has a better throughputs and robust to the packets loss.

What is claimed is:

1. A self-adaptive network control transmission method based on TCP, comprising adding network coding layers between a transmission layer and an IP layer of both a sender and receiver, adding network-coding headers which contains specific variables in coding packets and ACK packets, transmitting and refreshing those variables through the coding packets and ACK packets, and adjusting a redundancy factor R indicating send times of linear combinations in the network coding layer of the sender according to the variables, wherein:

on the sender, in the network coding layer, the specific variables which are added in the network-coding header of the coding packet include a linear coefficient vector γ and a variable pktID indicating a sequence number of a coding packet, those variables are subtracted by the network coding layer in the receiver, the vector γ is for decoding, and the variable pktID is evaluated to a new variable echo_pktID in the network coding layer of the receiver;

on the receiver, in the network coding layer, the specific variables which are added in the network-coding header of the ACK packet include echo_pktID and loss, wherein loss=pktID−id, echo_pktID indicates the only sequence number that results in generating the ACK packet, and the loss indicates the difference between pktID and id where id is an initial packet identification and is less than or equal to pktID, the ACK packet transmits the two variables to the sender;

when the network coding layer of the sender receives the ACK packet, it subtracts the network-coding header of the ACK packet and gets the echo_pktID and the loss;

wherein adjusting redundancy factor R in the network coding layer of the sender contains adding the following variables: R_old, which indicates the right-now redundancy factor, variable W indicates the minimum number of echo_pktID when the last time R changed, if echo_pktID equals the number of W+10*R_old or is larger than W+10*R_old for the first time, then the redundancy factor R is changed as follows:

use the loss to figure out the number of diff_loss_new in the network coding layer of the sender, that is diff_loss_new=loss−loss_old, wherein loss_old indicates the value of loss in ACK packet when the last time R changed, and diff_loss_new indicates the difference between the two adjacent losses;

use diff_loss_new to figure out the value of R_new, that is R_new=R_old+2*(diff_loss_new/10)+(diff_loss_old/10), wherein diff_loss_old indicates the value of diff_loss_new when the last time R changed;

refresh the variables in the network coding layer of the sender, that is R_old=R_new, loss_old=loss, diff_loss_old=diff_loss_new, W=W+10*R_new.

2. A self-adaptive network control transmission system based on TCP, including a sender and a receiver, wherein network coding layers are added between a transmission layer and an IP layer of both sender and receiver, and wherein the network coding layer of the sender handles packets which are sent from the transmission layer of the sender, encodes data packets and puts specific variables in network-coding headers, wherein the variables include a linear coefficient vector γ and a variable pktID indicating a sequence number of a coding packet, and will be extracted by the network coding layer of the receiver, the vector γ is for decoding and the variable pktID will be evaluated to a new variable echo_pktID in the network coding layer of the receiver, where echo_pktID indicates the only sequence number that results in generating a ACK packet and handles ACK packets which are sent from the receiver, subtracts the network-coding headers of ACK packet and gets echo_pktID, uses echo_pktID to determine whether it is time to change a variable R indicating send times of linear combinations, a variable W indicates the minimum number of echo pktID when the last time R changed, if echo_pktID equals the number of W+10*R_old or is larger than W+10*R_old for the first time, then the redundancy factor R is changed as follows:

use loss to figure out the number of diff_loss_new in the network coding layer of the sender, diff_loss_new=loss−loss_old, wherein loss_old indicates the value of loss in the ACK packet when the last time R was changed, and diff_loss_new indicates a difference between two adjacent losses;

use diff_loss_new to figure out the value of R_new, that is R_new=R_old+2*(diff_loss_new/10)+(diff_loss_ old/10), wherein diff_loss_old indicates the value of diff_loss_new when the last time R was changed;

refresh the variables in the network coding layer of the sender, R_old=R_new, loss_old=loss, diff_loss_old=diff_loss_new, W=W+10*R_new;

and wherein the network coding layer of the receiver handles ACK packets which are sent from the transmission layer of the receiver, determines whether the ACK packet is used to manage the connection, if so, sends the ACK packet to the IP layer; if not, discards it and returns back to wait;

and handles coding packets which are sent from the sender, upon receipt of a coding packet from the IP layer, subtracts the network-coding header and extracts the coding coefficient vector $\gamma$ and pktID, and decodes to get the initial packet, creates a new ACK packet which contains the two variables, loss and echo_pktID in the network-coding header, and sends the new ACK packet to the IP layer.

* * * * *